(12) United States Patent
Binot et al.

(10) Patent No.: US 6,824,692 B2
(45) Date of Patent: Nov. 30, 2004

(54) INSTALLATION FOR MEASURING CONCENTRATION IN DENSE GRANULAR MATERIAL OF A FLOW AND WATER TREATMENT SYSTEM COMPRISING SAME

(75) Inventors: Patrick Binot, Rentilly par Bussy Saint Georges (FR); Stanislas Rineau, Saint-Maurice (FR)

(73) Assignee: OTV S.A., Saint-Maurice Cedex (FR)

( * ) Notice: Subject to any disclaimer, the term of this patent is extended or adjusted under 35 U.S.C. 154(b) by 89 days.

(21) Appl. No.: 10/149,509

(22) PCT Filed: Oct. 17, 2001

(86) PCT No.: PCT/FR01/03222

§ 371 (c)(1),
(2), (4) Date: Sep. 12, 2002

(87) PCT Pub. No.: WO02/32539

PCT Pub. Date: Apr. 25, 2002

(65) Prior Publication Data

US 2003/0089667 A1 May 15, 2003

(30) Foreign Application Priority Data

Oct. 20, 2000 (FR) .......................................... 00 13499

(51) Int. Cl.⁷ .............................................. B01D 21/30
(52) U.S. Cl. ...................... 210/709; 210/711; 210/713; 210/723; 210/738; 210/788; 210/802; 210/805; 210/806; 210/202; 210/208

(58) Field of Search .............................. 210/709, 711, 210/712, 713, 723, 738, 787, 788, 802, 805, 806, 202, 208

(56) References Cited

U.S. PATENT DOCUMENTS

| | | | |
|---|---|---|---|
| 3,666,419 A | | 5/1972 | Cahour et al. ................. 23/230 |
| 4,279,759 A | | 7/1981 | Pardikes ...................... 210/709 |
| 4,927,543 A | * | 5/1990 | Bablon et al. .............. 210/711 |
| 5,641,397 A | * | 6/1997 | Grienberger ................. 210/97 |
| 5,730,864 A | | 3/1998 | Delsalle et al. .......... 210/195.1 |
| 6,588,601 B1 | * | 7/2003 | Costinel ..................... 210/406 |

FOREIGN PATENT DOCUMENTS

FR 2 627 704 9/1989
FR 2 719 235 11/1995

* cited by examiner

Primary Examiner—Robert A. Hopkins
(74) Attorney, Agent, or Firm—Westman, Champlin & Kelly

(57) ABSTRACT

The invention concerns an installation for measuring the concentration in dense granular material in a flow comprising a liquid, a dense granular material and suspended fine particles. The invention is characterised in that it comprises: at least a member for separating the dense granular material from the liquid and the suspended fine particles, at least a device for measuring (12, 12a, 13) at least a parameter representing the amount of separated dense granular material for a specific time interval T. Such an installation may be integrated in a ballasted-floc water treatment system.

20 Claims, 4 Drawing Sheets

INSTALLATION FOR MEASURING CONCENTRATION IN DENSE GRANULAR MATERIAL OF A FLOW AND WATER TREATMENT SYSTEM COMPRISING SAME

CROSS-REFERENCE TO RELATED APPLICATION

This Application is a Section 371 National Stage Application of International Application No. PCT/FR01/03222 filed Oct. 18, 2001 and published as WO02/32539 on Apr. 25, 2002, not in English.

FIELD OF THE INVENTION

The present invention relates to the domain of water treatment and is applied, in particular, to methods for treating liquid wastes, especially those using a flocculation-sedimentation system.

BACKGROUND OF THE INVENTION

These methods consist of adding one or several reagents to the waste water making it possible to coagulate at least a large part of the pollutant materials present in the waste and flocs, and then to separate the flocs thus formed from the purified water.

According to an advanced type of installation, intake means for at least one granular material denser than water, such as sand, are provided in such a way as to ballast the flocs in question and thus encourage and accelerate their sedimentation. Such a device is described in particular in the French patent FR2627704 published on Dec. 13, 1991 in the name of the Applicant.

This type of installation, called "installation for waste water treatment by ballasted flocs", comprises a coagulation zone in the usual way, provided with water intake means, intake means for adding at least one coagulating reagent, intake means for at least one granular material denser than water and stirring means; a flocculation zone provided with stirring means; at least one sedimentation zone provided with a zone for recuperation and evacuation of sludges, means for evacuation of clarified water able to integrate lamellae; and means for recycling at least a part of the granular material contained in said sludges upstream of the sedimentation zone. In most cases these recycling means include at least one hydrocyclone.

With this type of installation, control of the concentration of granular material in the fluid during treatment is usually carried out either by direct sampling in the flocculation zone, and measuring the concentration of granular material, or by dividing the flow-rate of treated water (in cu. m. per hour) by the flux of granular material (in kg/hr) recycled to ballast the flocs. This flux is measured in the underflow of the recycling hydrocyclone.

The principal aim of the present invention is to detect, either automatically or manually, the possible losses of granular material which can occur through the underflow of the recycling hydrocyclone, particularly in the case of small hydrocyclones.

Another aim of the present invention is to measure the concentration of granular material in the fluid during treatment, so as to detect any abnormal changes of this concentration.

A further aim of the present invention is to provide means enabling rapid resumption of normal conditions of concentration of granular material.

BRIEF SUMMARY OF THE INVENTION

These aims are achieved through the present invention which relates to an installation for measuring the concentration of dense granular material in a flow comprising a liquid, a dense granular material and fine particles in suspension, characterised in that it comprises at least one separation unit for separating the dense granular material on the one hand, and the liquid and fine particles in suspension on the other hand; and at least one measurement device for the measuring of at least one parameter representative of the quantity of dense granular material separated during a defined time period T.

It is understood that this type of installation can be used with any type of flow constituted of a liquid, a dense granular material (that is to say denser than the liquid in question) and fine particles in suspension. Preferably, the liquid in question is water, said dense granular material is sand or micro-sand and the fine particles are sedimentation sludges.

According to a variant of the invention, said separation organ of said dense granular material includes at least one sedimentation unit operating at a given flow-rate and at a sedimentation speed comprised between the sedimentation speed of the sludges and the sedimentation speed of the sand, in particular between 2 m/hr and 100 m/hr, and preferably between 10 m/hr and 50 m/hr and even more preferably at a speed of 30 m/hr.

Also, according to another variant of the invention, said separation unit for the separation of said dense granular material includes at least one hydrocyclone operating at a given flow-rate instead of a sedimentation unit and whose cutting size is chosen so as to separate the granular material in the underflow of the water from the fine particles in the upper flow.

According to a preferred variant of the invention, the installation comprises a storage capacity in which the underflow of said separation unit, containing the separated dense granular material, is stocked for said given time period T, said storage capacity being provided with at least one sensor able to measure the quantity of granular material stocked inside and an emptying means making it possible to empty said storage capacity. The sensor in question is advantageously a sensor enabling measurement of the height or the weight of said dense granular material. This sensor can be mounted so as to be height-adjustable. It is also possible to use a combination of two sensors.

The present invention also relates to a process for using an installation such as that described above, which consists of calculating the concentration of said granular material in said flow by comparing, at the end of each time period T, the quantity of granular material separated from the flow constituted by the liquid and the material sent to said separation unit.

According to a variant of the invention, the process consists of comparing said concentration in granular material with a predetermined value and, in function of the result of said comparison, of activating an alarm or the stop-start means of said installation, to maintain the concentration of dense granular material in said flow within the required limits.

According to another variant, the process consists of triggering an action (alarm, stop or start-up of the installation) when the weight or the height of material in said storage capacity exceeds a predetermined threshold.

The invention also applies to any water treatment system comprising:

at least one assembly of coagulation-flocculation zones provided with means for taking in water, means for taking in at least one coagulant agent, means for taking in at least one granular material denser than water, and stirring means;

at least one sedimentation zone provided with a recuperation and evacuation zone for sludges and means for evacuating clarified water;

means for recycling at least a part of the granular material contained in said sludges upstream relative to the sedimentation zone through the intermediary of a hydrocyclone or equivalent device, making it possible to recycle the granular material and to evacuate excess sludges as overflow, characterised in that it includes an installation for measuring the concentration of said dense granular material such as described above.

The invention thus relates to integrating, in such a system, means enabling automatic sampling of part of the waste, either directly in the coagulation zone or in the recycling means, to ascertain the quantity or concentration of granular material in this flow and consequently to obtain information about the operational quality of the system.

BRIEF DESCRIPTION OF THE DRAWINGS

The invention, together with its various advantages, will be more easily understood by reading the following description of two embodiments given in reference to the drawings in which.

DETAILED DESCRIPTION OF PREFERRED EMBODIMENTS

Figure 1:
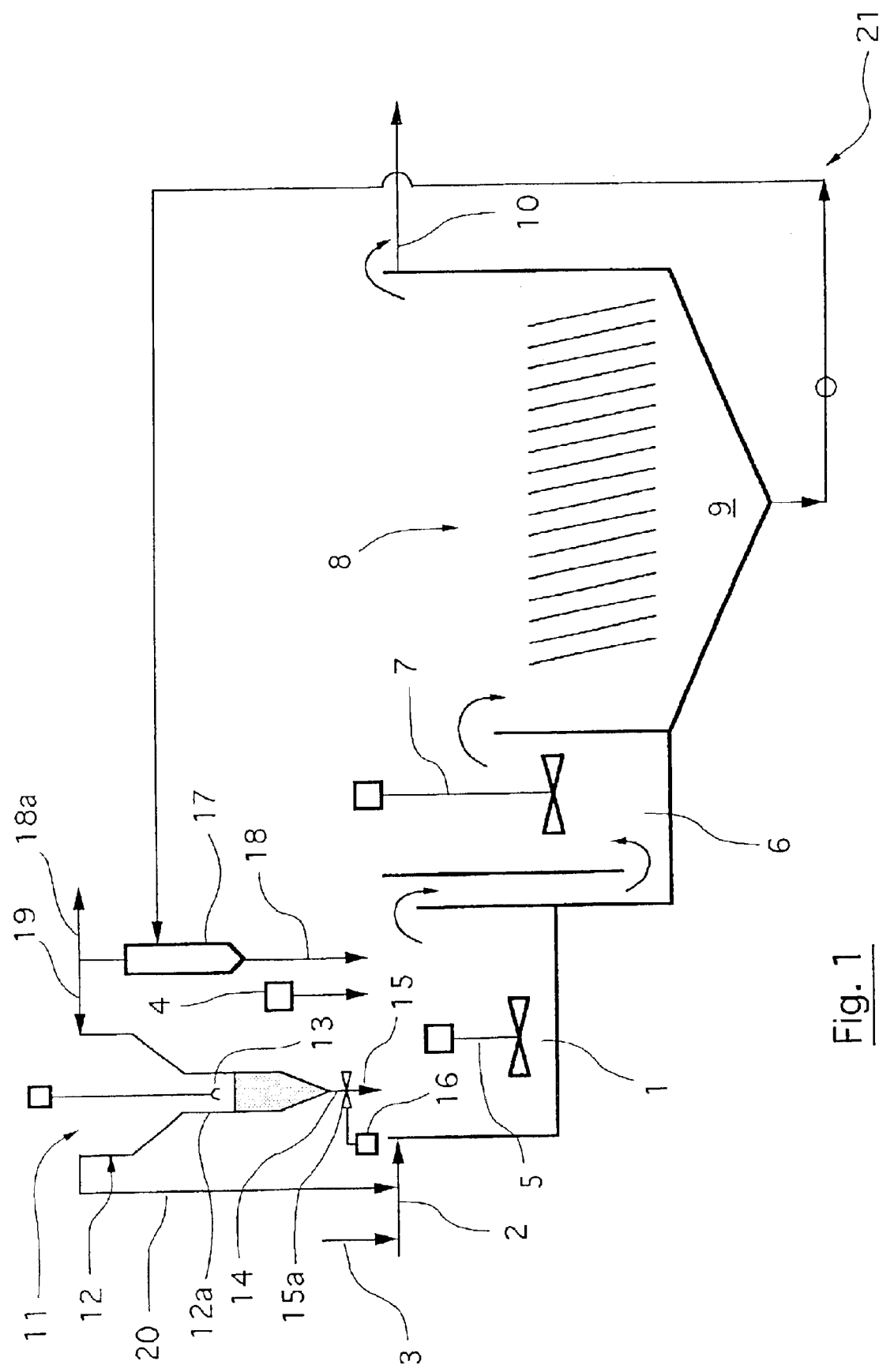
FIG. 1 is a diagram showing a first embodiment of a system for water treatment by ballasted flocs conforming to the present invention, in which a part of the waste is collected at the level of the upper flow of the hydrocyclone, making it possible to measure the concentration of granular material, which is usually very low in this upper flow, and to react when there is an abnormal increase in this concentration.

With reference to FIG. 1, the installation comprises, in series, a coagulation zone 1, a flocculation zone 6 and a sedimentation zone 8.

The coagulation zone is, in the usual way, provided with intake means for the water to be purified 2 (themselves equipped with distribution means 3 of a coagulating agent), of distribution means 4 of a granular material, in this case sand, and stirring means 5.

As for the flocculation zone, it is provided with a stirrer 7.

The sedimentation zone 8 is provided with lamellae and in its lower part has a recuperation and evacuation zone 9 for sludges, and in its upper part has evacuation means 10 for clarified water.

Furthermore, in the normal way, the installation comprises recycling means 21 for the granular material collected in the recuperation and evacuation zone 9 of the sedimentation zone 8. A channel connected to a pump leads the sludges collected in 9 to a hydrocyclone 17 provided with means 18 for distributing the separated granular material (and a little sludge, proportional to the hydrocyclone underflow/hydrocyclone-input ratio) to the flocculation zone 1 and means 18a for evacuating the rest of the sludges to the sludge treatment system.

According to the present invention, at least a part of the waste (in this case in the form of sludges containing very little granular material) issuing from the hydrocyclone is collected through a channel 19. This part of the sludge flow is transferred (at approximately constant flow-rate) to a separation unit 11 including a settler in the form of a sedimentation column 12 and a storage capacity 12a, preferably with smaller cross-section, to increase the sensitivity of measurement of the height of the settled material. This storage capacity 12a is provided at its lower part with an outlet 14 communicating with means 15 for redistributing the sand sediment from the storage capacity 12a into said flocculation basin 1. These redistribution means 15 include a valve 15a linked to time-delay means 16. The device 1 also comprises means 20 for redirecting the upper flow from the capacity 12a to the input means 2 of raw waste into the installation. Moreover, the storage capacity 12a is also equipped with a sensor 13 making it possible to detect a maximum height of sand in the storage capacity 12a (or a maximum weight of sand in the storage capacity 12a).

The Operation of the Installation is as Follows

Through the means according to the invention, part of the sludge flow from the hydrocyclone 17 is collected continuously at an approximately constant flow-rate. These collected sludges settle out in the storage capacity 12a where they are separated according to sand and an upper flow of water and sludge redirected continuously by means 20 at the top of the installation. Through the valve 15a and the time delay means 16, the sediment of sand in the storage capacity 12a is evenly redistributed into zone 1.

When the hydrocyclone is operating normally, the level of sand in the storage capacity 12a never reaches the threshold heights or weights defined by the sensor 13, since the sand arriving in low quantities is periodically freed from the capacity before reaching this threshold.

When the hydrocyclone is operating abnormally, the flow of sludges collected by the channel 19 contains an excessive amount of sand. The level of sand in the storage capacity 12a rises until it reaches the sensor 13 before the periodic opening of the valve 15a and provides information making it possible, either automatically or manually, to re-establish normal operation.

Figure 2:
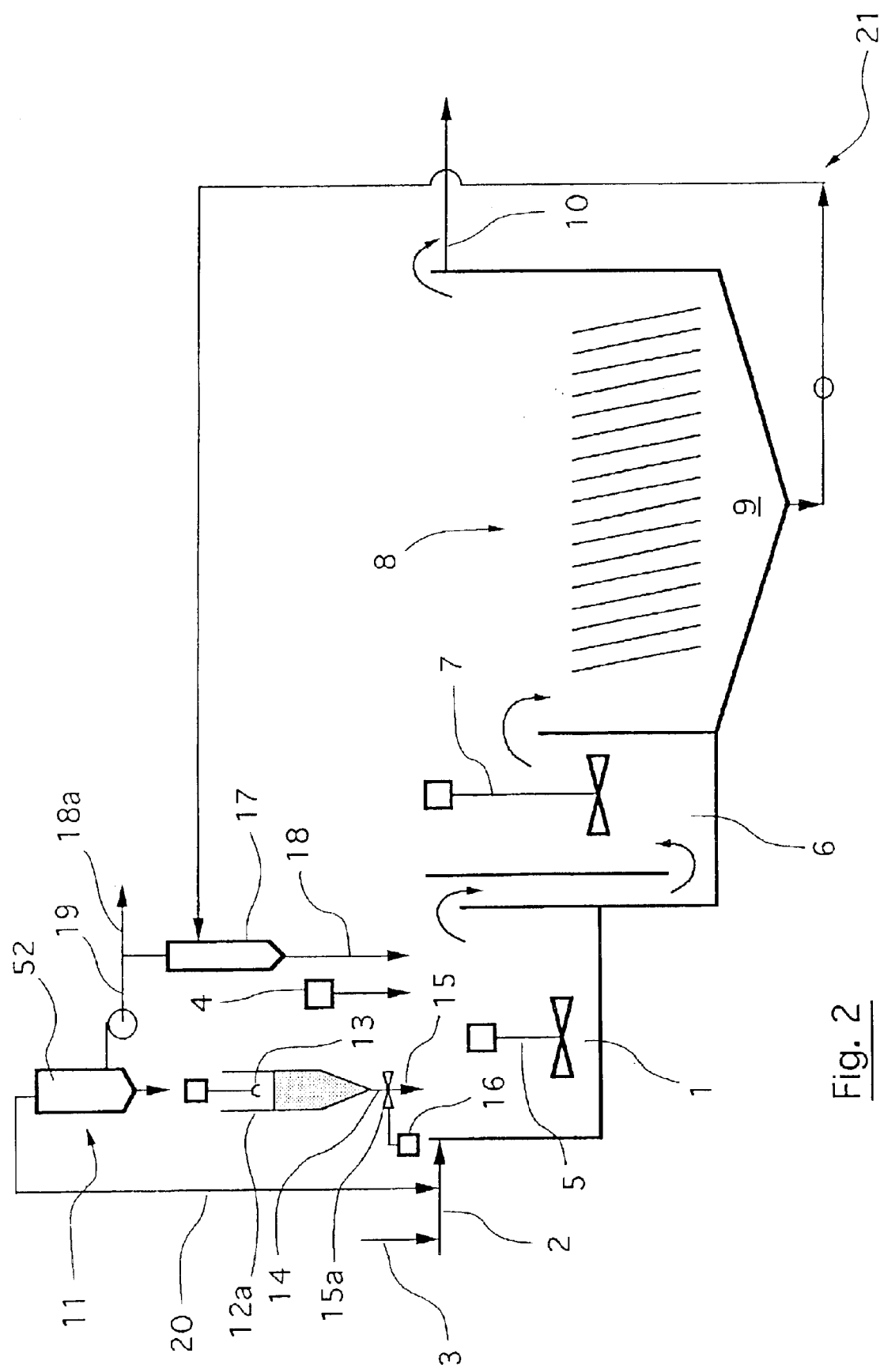
FIG. 2 is a variant of the first embodiment shown in FIG. 1.

In the variant of the invention shown in FIG. 2, the sedimentation column 12 has been replaced by a hydrocyclone 52.

Figure 3:
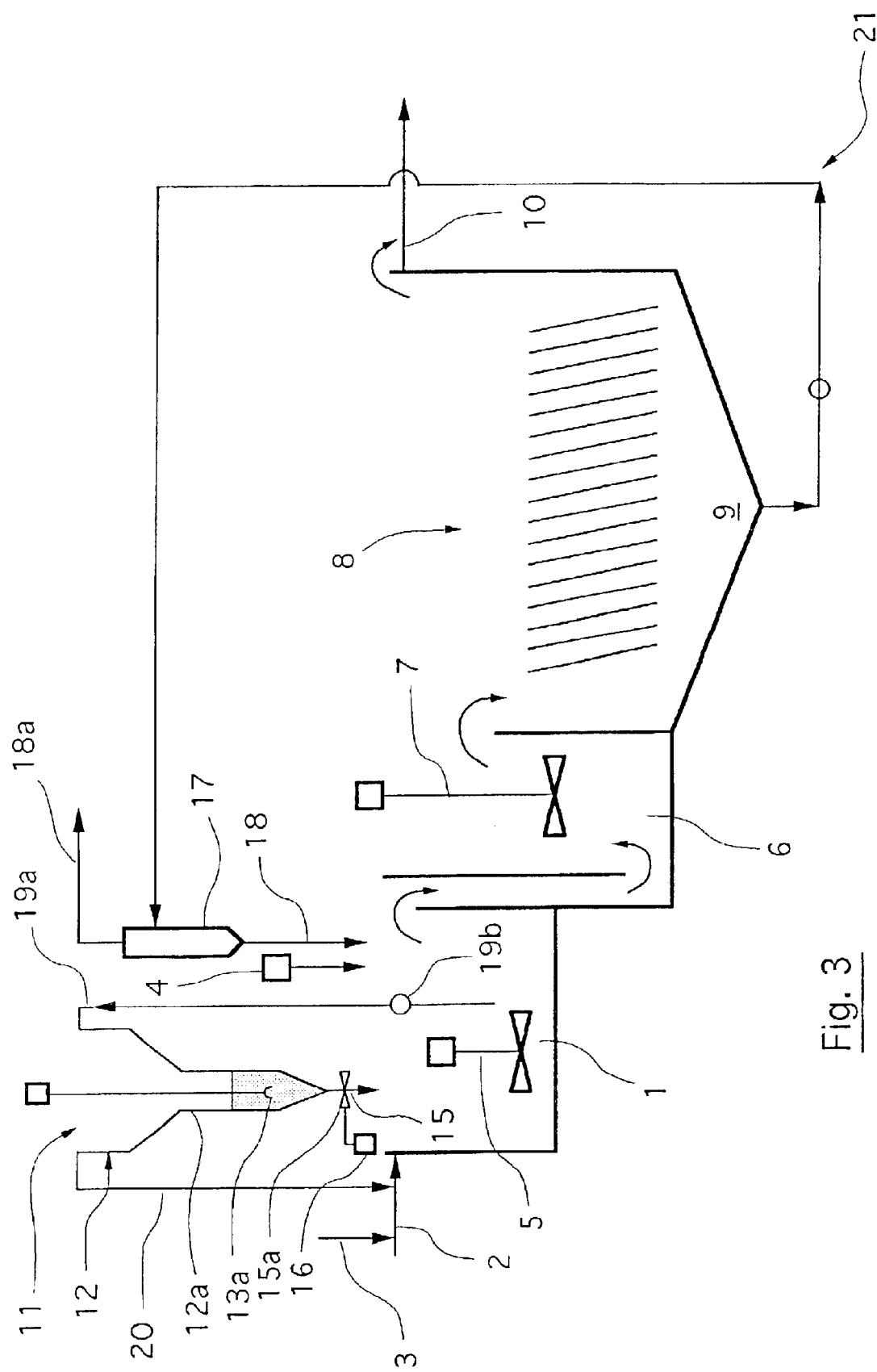
FIG. 3 shows, diagrammatically, a second embodiment of a water treatment installation by ballasted flocs according to the present invention, in which a part of the waste is collected in the flocculation zone, making it possible to measure the concentration of granular material in the flocculation zone.

In the embodiment shown in FIG. 3, in which elements which are the same as those of the embodiment shown in FIG. 1 and its variant shown in FIG. 2 are given the same reference numbers, the waste is collected not at the exit from the hydrocyclone but directly in the coagulation zone 1.

According to the present invention, part of the waste present in this basin (for example 5 m$^3$/hr) is collected through a channel 19a and by a pump 19b.

This part is transferred to a separation unit 11 including a settler in the form of a sedimentation column 12 with, at its lower part, a storage capacity 12a. This capacity is provided with an outlet 14 at its lowest part, communicating with the redistribution means 15 for the sand sediment in the storage capacity 12a in zone 1. These redistribution means 15 include a valve 12a connected to timing means. The device 1 also comprises means 20 for redirecting the upper flow from the storage capacity 12a to the means 2 for the intake of raw waste into the installation. Moreover, the storage capacity 12a is equipped with a sensor 13a making it possible to detect a minimum height of sand in said capacity. The Operation of the Installation is as Follows When the hydrocyclone is operating normally, that is to say when the concentration of sand in the basin 1 is normal (for example 3 kg m³ of flocculated waste), the level of sand in the storage capacity 12a still reaches the sensor 13a, because the sand accumulated in the capacity reaches the detection threshold in the capacity 12a before the periodic opening of the valve 15a.

When the hydrocyclone is operating abnormally, the concentration of sand in the waste collected by the channel 19 in the flocculation zone 1 is abnormally low. The sand level in the storage capacity 12a decreases until it reaches the minimum level, non-detectable by the sensor 13a, and provides information making it possible either automatically, or manually, to re-establish normal operation.

Figure 4:
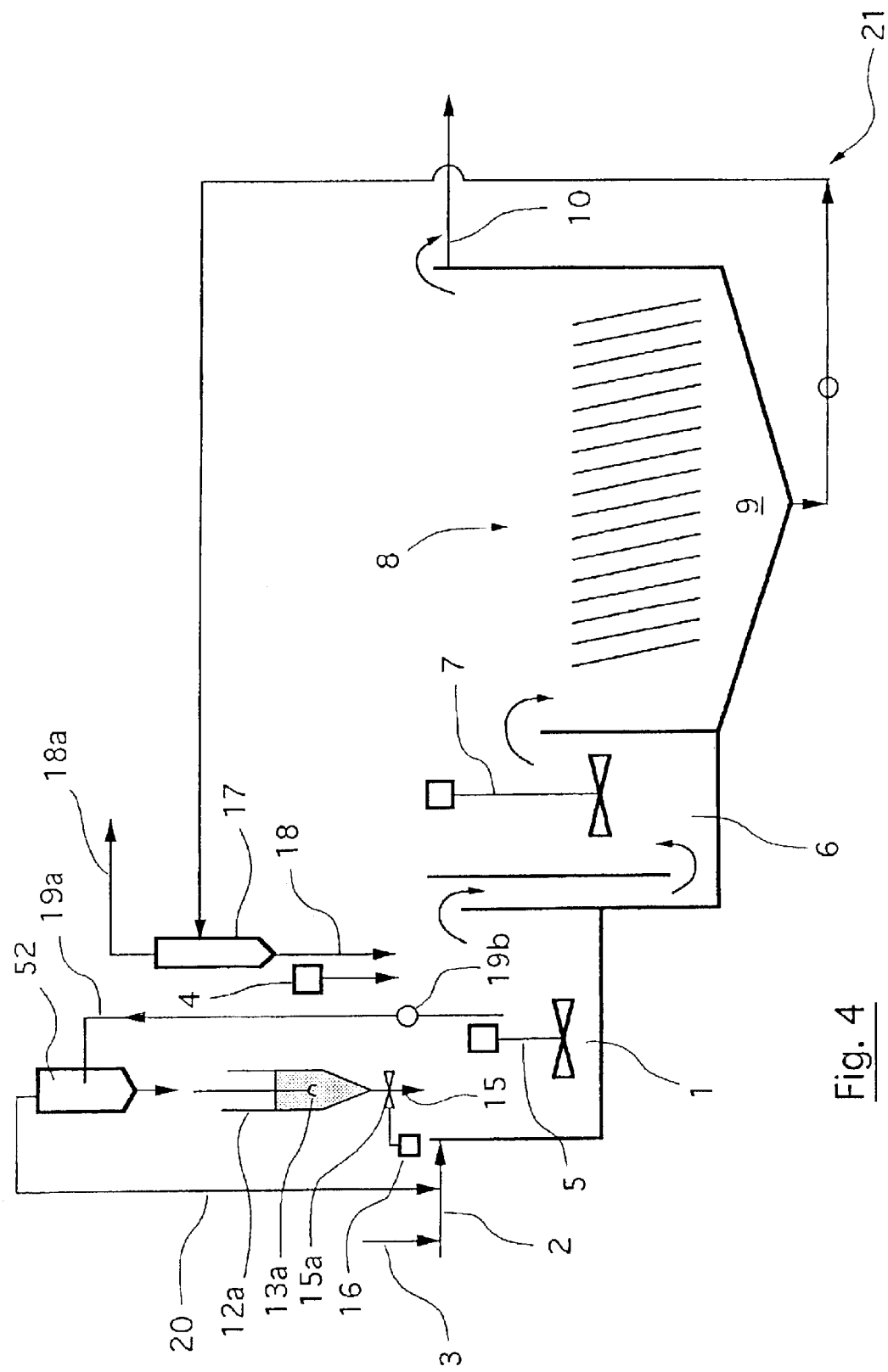
FIG. 4 shows a variant of the second embodiment of FIG. 3.

In the variant, shown in FIG. 4, the sedimentation column 12 has been replaced by a hydrocyclone 52.

The embodiments according to the invention described herein do not in any way reduce the range of the present invention. Thus, numerous modifications can be added without going beyond the framework of the invention. Thus, in particular, the gravitational separation method can be replaced by any other appropriate separation method, such as hydrocycloning, centrifuging, etc.

What is claimed is:

1. Installation for measuring the concentration of dense granular material in a flow comprising a liquid, a dense granular material and fine particles in suspension, characterised by:
   at least one separation unit for the separation of the dense granular material from liquid and fine particles in suspension;
   at least one measuring device comprising a time delay element for the measuring of at least one parameter representing the quantity of dense granular material separated during a predetermined time period T.

2. Installation according to claim 1, characterised in that said liquid is water and said fine particles in suspension are sedimentation sludges.

3. Installation according to claim 2, characterised in that said dense granular material is sand.

4. Installation according to claim 2, characterised in that said separation unit for the separation of the dense granular material includes at least one sedimentation unit operating at a given flow-rate and at a sedimentation speed comprised between the sedimentation speed of the sludges and the sedimentation speed of sand.

5. Installation according to claim 4, characterised in that said sedimentation unit operates at a sedimentation speed comprised between 2 m/hr and 100 m/hr.

6. Installation according to claim 5, characterised in that the sedimentation speed is comprised between 10 m/hr and 50 m/hr.

7. Installation according to claim 6, characterised in that the sedimentation speed is 30 m/hr.

8. Installation according to claim 1, characterised in that said separation unit of dense granular material includes at least one hydrocyclone.

9. Installation according to claim 1, characterised by a storage capacity in which the underflow of said separation unit, containing the separated dense granular material, is stored during said given time period T, said storage capacity being provided with a sensor for measuring the quantity of granular material stored within, and an emptying means for emptying said capacity after overflow.

10. Installation according to claim 9, characterised in that said sensor is a sensor for measuring the height or the weight of said dense granular material.

11. Method for using an installation according to claim 1, characterised by providing a device connected to the at least one measuring device for calculating the concentration of said granular material in said flow by comparing, automatically or not, at the end of each time period T, the quantity of separated granular material to the flow constituted by the liquid and the material sent to said separation unit.

12. Method for using an installation according to claim 11, characterised by comparing said concentration in granular material to a predetermined value and, in function of the result of said comparison, of activating an alarm, or means of stopping—restarting said installation in order to maintain the concentration of dense granular material in said flow-rate within the required limits.

13. Method for using an installation according to claim 11, characterised by starting an action when the weight or the height of material in said capacity exceeds a predetermined threshold.

14. Installation according to claim 3, characterised in that said separation unit for the separation of the dense granular material includes at least one sedimentation unit operating at a given flow-rate and at a sedimentation speed comprised between the sedimentation speed of the sludges and the sedimentation speed of sand.

15. Installation according to claim 14, characterised in that said sedimentation unit operates at a sedimentation speed comprised between 2 m/hr and 100 m/hr.

16. Installation according to claim 2, characterised in that said separation unit of dense granular material includes at least one hydrocyclone.

17. Installation according to claim 2, characterised by a storage capacity in which the underflow of said separation unit, containing the separated dense granular material, is stored during said given time period T, said storage capacity being provided with a sensor for measuring the quantity of granular material stored within, and an emptying means for emptying said capacity after overflow.

18. Method for using an installation according to claim 2, characterised by providing a device connected to the at least one measuring device for calculating the concentration of said granular material in said flow by comparing, automatically or not, at the end of each time period T, the quantity of separated granular material to the flow constituted by the liquid and the material sent to said separation unit.

19. Method for using an installation according to claim 18, characterised by comparing said concentration in granular material to a predetermined value and, in function of the result of said comparison, of activating an alarm, or means of stopping—restarting said installation in order to maintain the concentration of dense granular material in said flow-rate within the required limits.

20. System for water treatment comprising:
   at least one assembly of coagulation-flocculation zones provided with water intake means, intake means for at least one coagulating reagent, intake means for at least one granular material denser than water and stirring means;
   at least one sedimentation zone provided with a recuperation and evacuation zone for sludges and means for evacuating clarified water;
   means for recycling at least a part of the granular material contained in said sludges upstream relative to the sedimentation zone through the intermediary of a hydrocyclone making it possible to recycle the granular material and to evacuate excess sludges as overflow, characterised by:

an installation for measuring the concentration of said dense granular material comprising at least one separation unit for the separation of the dense granular material from liquid and fine particles in suspension, and at least one measuring device for the measuring of at least one parameter representing the quantity of dense granular material separated during a predetermined time period T.

* * * * *